No. 898,256.
PATENTED SEPT. 8, 1908.
J. G. OLSON.
ROTARY WEED CUTTING MACHINE.
APPLICATION FILED JUNE 20, 1907.
2 SHEETS—SHEET 2.
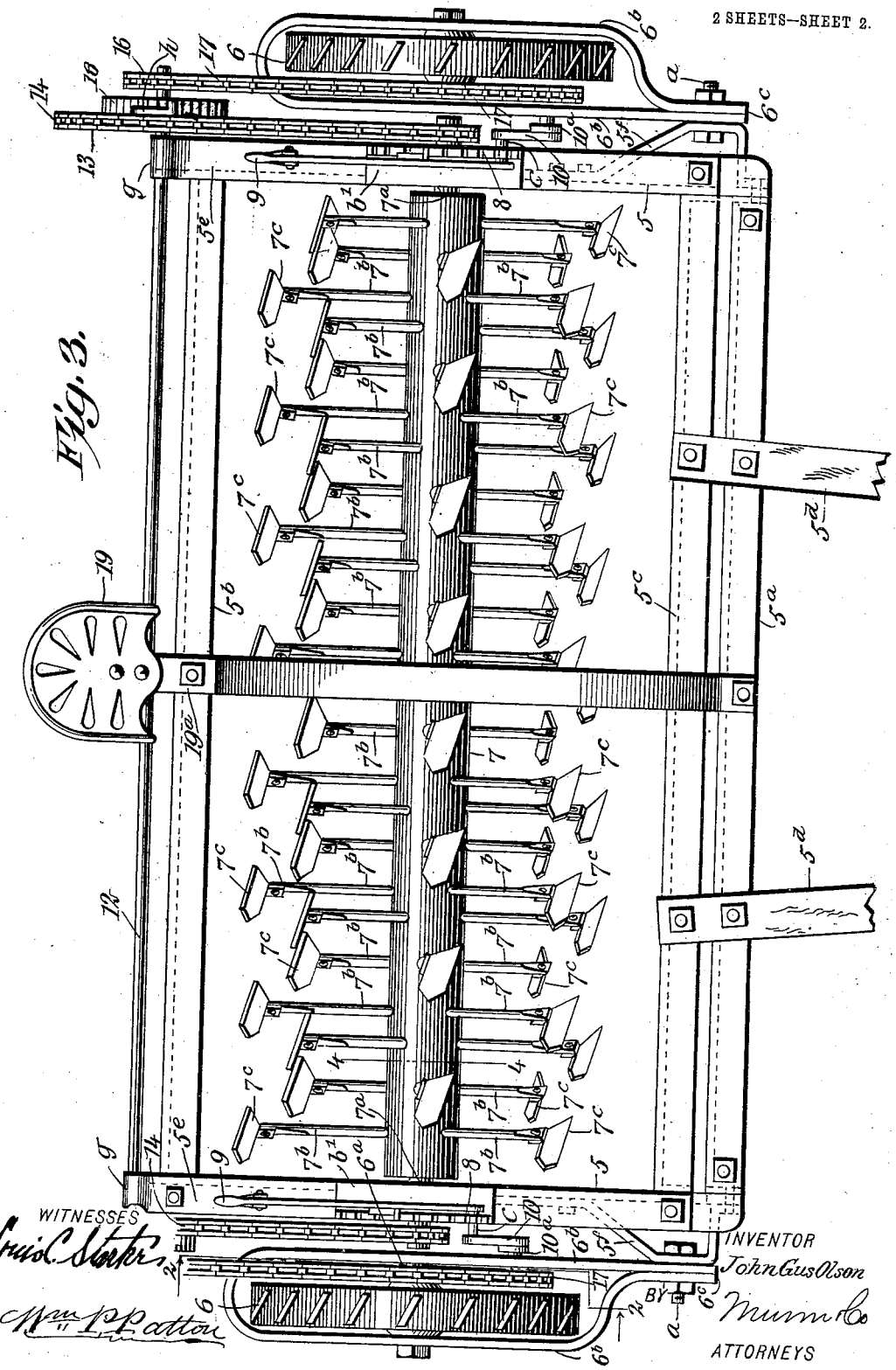

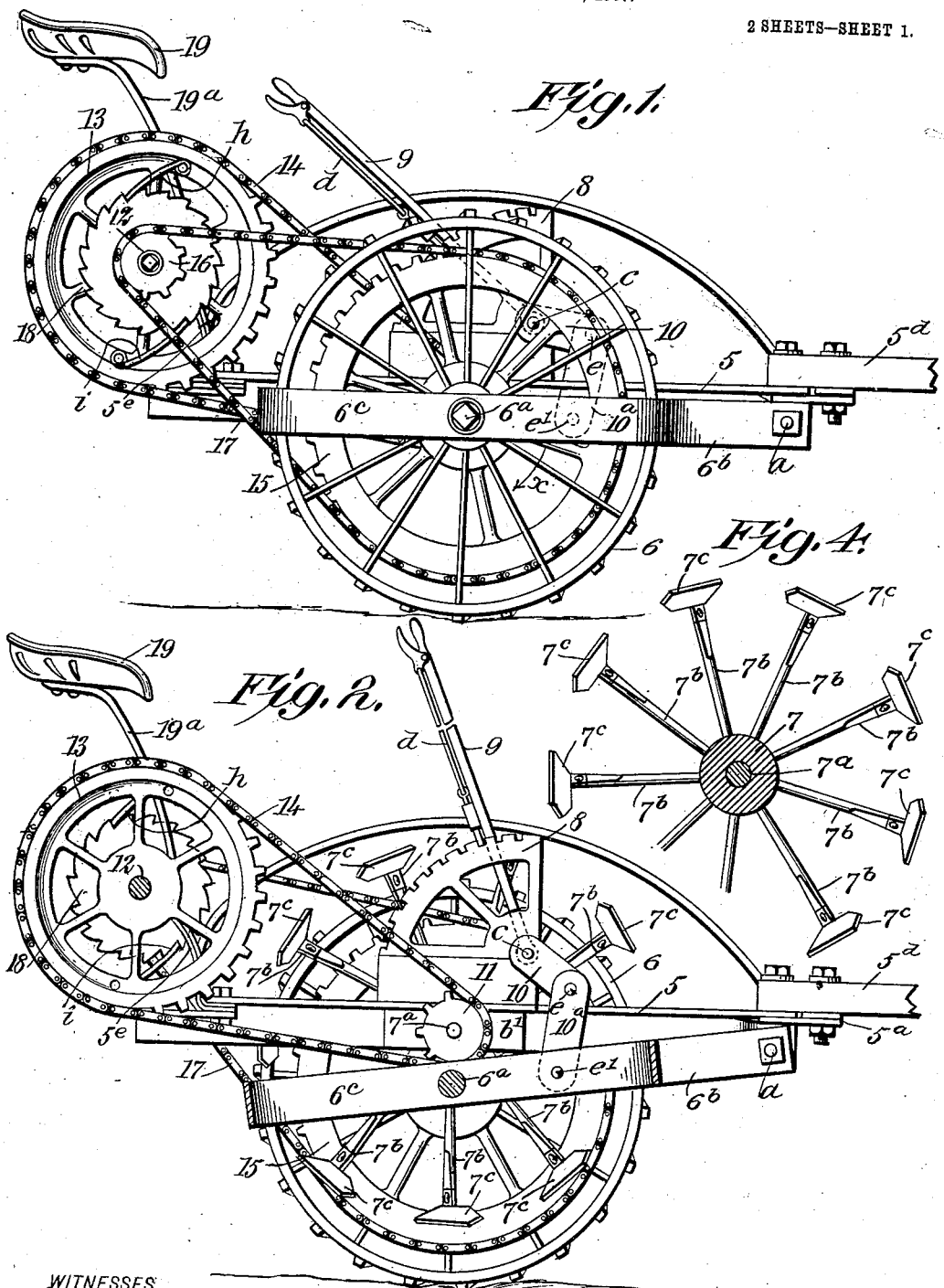

UNITED STATES PATENT OFFICE.

JOHN GUS OLSON, OF HARRINGTON, WASHINGTON.

ROTARY WEED-CUTTING MACHINE.

No. 898,256.　　　　Specification of Letters Patent.　　　　Patented Sept. 8, 1908.

Application filed June 20, 1907. Serial No. 379,909.

*To all whom it may concern:*

Be it known that I, JOHN GUS OLSON, a citizen of the United States, and a resident of Harrington, in the county of Lincoln and State of Washington, have invented a new and Improved Rotary Weed-Cutting Machine, of which the following is a full, clear, and exact description.

This invention relates to a class of machines employed for the killing of weeds by cutting them off at or below the surface of the ground; and has for its object to provide novel details of construction for a machine of the character indicated, which embody a plurality of cutter blades, carried on the ends of arms radiating from a rotatable shaft, means for supporting said shaft, means for progressively moving the same and means for rotating the cutter shaft and blades as said shaft is progressively moved.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is an end elevation of the machine, showing details thereof arranged for service; Fig. 2 is a similar view, parts being in section, on the line 2—2 in Fig. 3, seen in direction of the arrow; Fig. 3 is a plan view; and Fig. 4 is a transverse sectional view, substantially on the line 4—4 in Fig. 3.

A rectangular gear carrying frame is provided for the relative support of the working details and as shown, comprises two angle iron side bars 5, 5, held spaced apart in parallel planes by the similar frame bars $5^a$, $5^b$, located respectively at the front and rear ends of said side bars 5. This frame is further provided with a reinforcing transverse bar $5^c$ of angle iron, located rearward of and near the front frame bar $5^a$, these parts of the gear frame being secured together by bolts or rivets, thus providing a strong, light and durable structure. Two shaft bars $5^d$ are secured by their rear portions across and centrally on the forward transverse frame bars $5^c$, $5^a$, and thence extend forwardly, said bars being of wood or other suitable material. Two similar traction wheels 6, 6, of suitable diameter, are employed for the support of the gear frame and parts mounted thereon. The traction wheels are each centrally secured upon a short shaft $6^a$, which has its ends journaled in side members $6^b$ of a looped frame $6^c$, these supplementary frames being each loosely secured upon the gear frame by their pivotal attachment upon laterally bent frame members $5^f$, that respectively project at each side of the gear frame, as appears in Fig. 3 at $a$, this engagement being at the forward ends of the supplementary frames.

The weed cutting mechanism comprises a drum 7, having axial journal ends $7^a$ projected therefrom, and into depending boxes $b'$ on the side bars 5, 5. From the drum 7, similar radial arms $7^b$ project at suitable intervals throughout its peripheral area, and at the outer ends of said arms cutting blades $7^c$, of similar form, are secured in such transverse positions as adapt them to enter their cutting edges beneath the soil at a slight angle and with a shear cut engage growing weeds at their roots for their severance.

A toothed sector 8 is mounted on each of the side bars 5, 5, above the journal ends of the drum 7, as best shown in Fig. 2, and at the radial center of each sector, a short shaft $c$ is journaled therein and projects through the same. Upon the ends of the journal shafts $c$, that are adjacent to the corresponding ends of the drum 7, the lower end of a lever 9 is secured upon each, these levers having spring pressed slide bolts $d$ thereon which, at their lower ends, are engaged with the teeth of the sectors 8 respectively, as appears in Fig. 3 where one bolt end is plainly shown. Upon respective ends of short shafts $c$ that project outside of the sectors 8, two similar arms 10 are firmly secured near one end of each arm, and upon the other end of each arm 10 the upper end of a link bar $10^a$ is pivoted, as shown at $e$ in Figs. 1 and 2. The link bars $10^a$ are of an equal length, and at their lower ends are pivoted respectively upon the inner members $6^b$ of the supplementary frames $6^c$, as appears at $e'$, this pivot for each link bar being near to a respective short shaft $6^a$.

It will be seen that by the described construction and arrangement of parts, the adjustment of the levers 9 to give them a nearly erect position, will serve to correspondingly raise the gear frame and adjust the arms 10 and links $10^a$ so as to cause the cutter blades $7^c$ to be elevated above the level of the ground traversed by the machine, as shown in Fig. 2. Furthermore, if the levers 9 are rocked rearwardly into the similarly inclined positions represented in Fig. 1, and the bolts d engaged with the teeth of the sectors 8, the relative disposal of the arms 10 and the link bars 10ª, will tend to lower the gear frame and cutters for engagement of the latter with the soil, it being obvious that the traction wheels 6, 6, serve as movable bases for the gear frame and parts thereon, so that the latter may be readily rocked to raise or lower it, when the levers are changed in adjustment.

Upon the journaled end portions $7^a$ of the drum 7, which project outside of the bracket boxes $b'$ on the gear frame side bars 5, 5, two similar small sprocket gears 11 are respectively mounted and secured, space being afforded between said side bars and the members $6^b$ of the supplementary frame 6 to permit the location of the sprocket gears therebetween.

An arm $5^e$ is projected upward and rearward from each side bar 5 of the gear frame, said arms terminating at their upper ends in boxes $g$, that receive journaled ends of a counter shaft 12. Upon the shaft 12, near each end thereof, a sprocket gear 13 is loosely mounted. These similar gears that are respectively positioned opposite the small sprocket gears 11 are therewith connected in pairs by two sprocket chains 14. Upon the shafts $6^a$, at the inner side of each traction wheel 6 thereon, a sprocket gear 15 of considerable size is secured, said gears having equal diameter.

The ends of the counter shaft 12 are extended outside of the boxes $g$ and upon said ends two similar sprocket gears 16 are fixedly mounted, each one respectively opposite the gear 15 on a shaft $6^a$ it is to receive motion from. Each pair of gears 15, 16, receives a sprocket chain 17, which chains coact to transmit rotary motion from the traction wheels to the counter shaft by the following means.

A ratchet gear 18 is mounted and secured upon the counter shaft 12 at the side of each sprocket gear 13, and upon the latter a spring pawl $h$ is affixed by one end, and at the free end engages between teeth of the ratchet gear it is opposite. A detent pawl $i$ is also placed on each sprocket gear 13 opposite from the pawl $h$ thereon, and engages the teeth of the ratchet gear in a way to prevent a reversed motion of the sprocket gear 13 at each end of the counter shaft 12.

A seat 19 is supported on the gear frame at its longitudinal center and rear side by an arm $19^a$, and the length of the gear frame is such that a driver seated upon the seat 19 may adjust the levers 9 as occasion may require.

In arranging the machine for movement to the field, where it is to be used for cutting weeds or the like, the gear frame is raised and the cutter mechanism also, as represented in Fig. 2.

In service, the machine being drawn by a draft animal hitched thereto, is moved over the soil, after the rotary cutters are lowered as indicated in Fig. 1 and hereinbefore fully explained.

Through the geared connection of the drum 7, radially supported arms $7^b$ and cutter-blades $7^c$, the latter when engaged with the soil, will be rotated in direction of the curved arrow $x$ in Fig. 1, and with shear cutting action cleanly sever the weeds at or near the surface of the ground, or, if desired, below said surface.

By provision of the ratchet gear, the rotary motion of the traction wheels 6 is transmitted to the counter shaft 12, in a forward direction only, and if one traction wheel is arrested or runs slower than the other one, the counter shaft and drum will still receive proper rotation and in no case be rotated in a reversed direction.

Having thus described my invention, I claim as new and desire to secure by Letters Patent:

1. A weed cutter, comprising a main frame, a rotary cutter mounted in the frame, gearing mounted in the frame for operating the cutter, pivoted loop-shaped supplementary frames, one at each side of the main frame, said frames being pivoted at their forward ends to the forward part of the main frame, traction wheels in the supplementary frames, means for operating the gearing from the traction wheels, and means for adjusting each supplemental frame.

2. The combination of a main frame, a rotary cutter mounted in the frame, a supplementary loop-shaped frame pivoted at one end to the main frame at each side thereof, means for adjusting each supplemental frame, traction wheels mounted in the supplementary frames, a counter shaft mounted in the main frame, means for operating the counter shaft from the traction wheels, and means for operating the cutter from the counter shaft.

3. The combination of a main frame, a rotary cutter mounted in the frame, a supplementary loop shaped frame pivoted at one end to the forward part of the main frame at each side thereof, traction wheels mounted in the supplementary frames, a counter shaft mounted in the rear part of the main frame, sprocket and chain gearing for operating the counter shaft from the traction wheels, and sprocket and chain gearing for operating the cutter from the counter shaft.

4. The combination of a main frame, a rotary cutter mounted in the frame, a sprocket wheel on each end of the cutter, a counter shaft mounted in the rear part of the main frame, large sprocket wheels loose on the counter shaft, ratchet and pawl connections between the sprocket wheels and shaft, a small sprocket wheel fixedly secured to the end of the counter shaft, two supplementary frames pivoted at one end to the forward part of the main frame at the sides thereof, traction wheels mounted in the supplementary frames, large sprocket wheels on the axles of the traction wheels, chains connecting the sprocket wheels of the traction wheels with the small sprocket wheels of the counter shaft, and chains connecting the large sprocket wheels of the counter shaft with the sprocket wheels of the cutter.

In testimony whereof I have signed my name to this specification in the presence of two subscribing witnesses.

JOHN GUS OLSON.

Witnesses:
    F. M. LYNCH,
    W. C. MORGAN.